United States Patent [19]

Takotani et al.

[11] Patent Number: 5,172,886
[45] Date of Patent: Dec. 22, 1992

[54] FLUID FLOW CONTROL VALVE ASSEMBLY

[75] Inventors: Tetsuzo Takotani, Osaka; Kazuma Horita, Hyogo, both of Japan

[73] Assignee: Taiyo, Ltd., Osaka, Japan

[21] Appl. No.: 686,040

[22] Filed: Apr. 16, 1991

[30] Foreign Application Priority Data

Oct. 16, 1990 [JP] Japan .................. 2-108675

[51] Int. Cl.⁵ .................. F16K 1/52; F16K 39/02
[52] U.S. Cl. .................. 251/205; 251/215; 251/274; 251/282
[58] Field of Search .......... 251/205, 215, 264, 274, 251/282

[56] References Cited

U.S. PATENT DOCUMENTS

| | | | |
|---|---|---|---|
| 1,861,916 | 6/1932 | Hennebohle | 251/282 |
| 2,084,698 | 6/1937 | Mollet | 251/215 |
| 2,191,128 | 2/1940 | Jolly et al. | 251/274 |
| 2,672,883 | 3/1954 | Dillman | 251/205 X |
| 2,887,293 | 5/1959 | Gasche | 251/274 X |
| 3,138,175 | 6/1964 | Chilcoat | 251/282 X |
| 3,139,262 | 6/1964 | Morris et al. | 251/205 |
| 3,410,521 | 11/1968 | Sowers, III et al. | 251/205 |
| 3,467,357 | 9/1969 | Schomer et al. | 251/215 X |
| 4,283,041 | 8/1981 | Kujawski | 251/274 X |

FOREIGN PATENT DOCUMENTS

| | | | |
|---|---|---|---|
| 554766 | 3/1958 | Canada | 251/205 |
| 574745 | 4/1959 | Canada | 251/205 |
| 1100584 | 1/1968 | United Kingdom | 251/215 |

Primary Examiner—John Rivell
Attorney, Agent, or Firm—Koda and Androlia

[57] ABSTRACT

A fluid flow control valve assembly which comprises a valve housing having defined therein a valve chamber defined therein a valve hole, inflow and outflow ports adapted to be communicated with each other through the valve chamber by way of the valve hole; and a valve rod inserted exteriorly of the housing and into the valve chamber and coupled with a handle for turning the valve rod about a longitudinal axis thereof thereby to move the valve rod in a direction coaxial with the longitudinal axis of the valve rod to adjust an opening of the valve hole. The valve rod includes a valve member formed on one end of the valve rod confronting the valve chamber and axially movably inserted in the valve hole, and a shank portion formed on a generally intermediate portion of the valve rod and slidably, but fluid-tightly sealing the valve chamber. The valve member and the shank portion have respective cross-sectional areas which are equal to each other so that fluid pressure acting on the valve rod tending to move the latter in directions opposite to each other are counterbalanced thereby to avoid an axial thrust which would otherwise act on the valve rod.

2 Claims, 1 Drawing Sheet

FLUID FLOW CONTROL VALVE ASSEMBLY

BACKGROUND OF THE INVENTION

1. Field of the Invention

The present invention generally relates to a fluid flow control valve assembly and, more particularly, to a throttle valve assembly for controlling the flow of a fluid medium therethrough.

2. Description of the Prior Art

It is well known that a fluid circuit used in various applications include one or more fluid flow control valve assemblies each operable to regulate the flow of a fluid medium under pressure. A throttle valve assembly is an example of the fluid flow control valve assembly.

The prior art throttle valve assembly generally comprises a housing having defined therein an inflow port, an outflow port, a valve chamber intervening between the inflow and outflow ports, and a valve hole communicating the valve chamber with the outflow port. This valve housing includes a valve rod inserted exteriorly of the valve housing and into the valve chamber. The valve rod is capable of being axially moved between open and closed positions when a manipulatable handle operatively coupled with the valve rod and positioned external to the valve housing is turned, thereby to adjust the opening of the valve hole.

In the prior art throttle valve assembly, a generally elongated valving member used to close the valve hole when the valve rod is moved to the closed position has a diameter generally smaller than a shank portion of the valve rod which is used to seal the valve chamber.

Also, the valve rod generally used in the prior art throttle valve assembly is integrally formed with an adjustment screw member which is threadingly engaged in the valve housing and is adapted to be rotated by turning the handle.

In view of the foregoing, the prior art throttle valve assembly has been found having the following problems. Namely, assuming that a fluid medium under pressure is supplied to the throttle valve assembly, and particularly when the throttle valve assembly is adjusted to discharge the fluid medium at a relatively low rate, a relatively large axial thrust tending to displace the valve rod outwardly in the axial direction acts on the valve rod by reason of a difference in cross-sectional area between the valving member and the shank portion of the valve rod. This relatively large axial thrust causes a surface pressure to be generated between tooth faces of an internally threaded portion formed in the housing and those of an externally threaded portion formed on the adjustment screw. Because of this surface pressure, the tooth faces of the internally threaded portion in the housing and those of the externally threaded portion on the adjustment screw are frictionally engaged when the handle is turned, imposing a resistance to the turn of the handle. Therefore, the handle becomes hard to turn, requiring an increased turning force to be applied thereto. This tends to hamper a fine flow adjustment.

Also, in the prior art throttle valve assembly, since the valve rod and the adjustment screw member are formed integrally therewith, a relatively highly precise machining is required in order for the assembly of the valve rod and the adjustment screw member to be accurately aligned with the internally threaded portion in the valve housing and/or the valve hole, rendering it difficult to machine the adjustment screw member and the valve rod.

SUMMARY OF THE INVENTION

The present invention has been devised with a view to substantially obviating the above discussed problems and is intended to provide an improved fluid flow control valve assembly wherein the axial thrust which would act on the valve rod when the flow of the fluid medium under pressure is throttled down can be advantageously minimized to facilitate an easy turn of the handle.

In order to accomplish the objective of the present invention, there is provided, in accordance with a preferred embodiment thereof, a fluid flow control valve assembly which comprises a valve housing having defined therein a valve chamber defined therein a valve hole, inflow and outflow ports adapted to be communicated with each other through the valve chamber by way of the valve hole; and a valve rod inserted exteriorly of the housing and into the valve chamber and coupled with a handle for turning the valve rod about a longitudinal axis thereof thereby to move the valve rod in a direction coaxial with the longitudinal axis of the valve rod to adjust an opening of the valve hole.

The valve rod includes a valve member formed on one end of the valve rod confronting the valve chamber and axially movably inserted in the valve hole, and a shank portion formed on a generally intermediate portion of the valve rod and slidably, but fluid-tightly sealing the valve chamber. The valve member and the shank portion have respective cross-sectional areas which are equal to each other. Accordingly, fluid pressures acting on the valve rod tending to move the latter in directions opposite to each other are counterbalanced thereby to avoid an axial thrust which would otherwise act on the valve rod.

BRIEF DESCRIPTION OF THE DRAWINGS

In any event, the present invention will become more clearly understood from the following description of a preferred embodiment thereof, when taken in conjunction with the sole accompanying drawing wherein.

DETAILED DESCRIPTION OF THE EMBODIMENT

Figure 1:
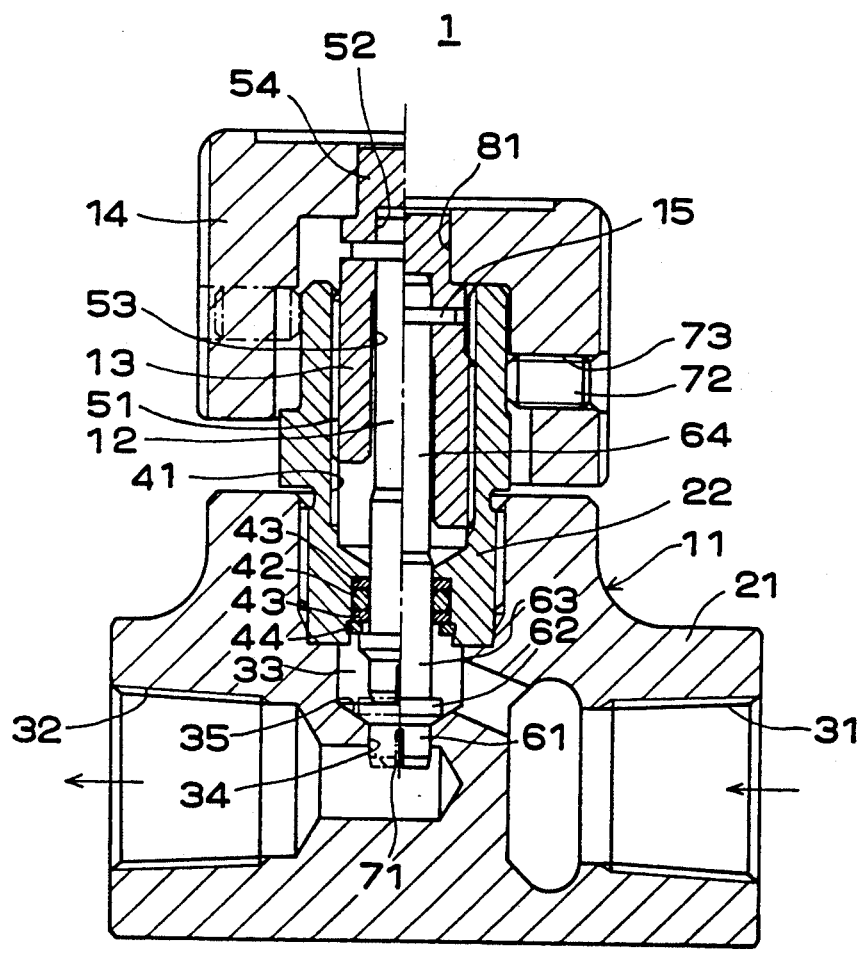
FIG. 1 illustrates a longitudinal sectional view of a throttle valve assembly embodying the present invention. However, the embodiment and the drawings are given only for the purpose of illustration and explanation, and are not to be taken as limiting the scope of the present invention in any way whatsoever, which scope is to be determined solely by the appended claims.

Referring to the sole drawing of FIG. 1, it is to be noted that left-hand and right-hand portions of the throttle valve assembly shown therein are shown in different operative positions. Specifically, the throttle valve assembly shown in the left-hand portion of FIG. 1 is in a open position while that shown in the right-hand portion of FIG. 1 is in a closed position.

The throttle valve assembly shown therein and generally identified by 1 comprises a valve housing 11, a valve rod 12, an adjustment screw member 13 and a handle 14 mounted on one end of the adjustment screw member 13 for rotation together therewith. The valve housing 11 includes a valve body 21 having an inflow port 31 and an outflow port 32 defined therein generally in opposition to each other, a valve chamber 33 defined therein and positioned generally intermediate between the inflow and outflow ports 31 and 32, and a valve hole 34 also defined therein and communicating the valve chamber 33 to the outflow port 32. This valve housing has an annular valve seat 35 positioned between the valve chamber 33 and the valve hole 34 and so shaped as to taper downwardly as viewed in FIG. 1 while concurrently defining a bottom of the valve chamber 33.

The valve housing 11 also includes a generally tubular guide member 22 firmly threaded into the valve body 21 in alignment with the valve chamber 33. This tubular guide member 22 has a longitudinally extending hollow open at its opposite ends, which hollow is substantially divided into lower and upper cavities by a perforated partition wall radially inwardly extending from an inner surface thereof. A portion of the inner surface of the tubular guide member 22 confronting the upper cavity is at least partially formed with a helical internally threaded portion 41 for engagement with a corresponding helical externally threaded portion 51 formed on an outer peripheral surface of the adjustment screw member 13.

An annular gasket 42 is accommodated within the lower cavity of the tubular guide member 22 and retained firmly in position by means of annular retainer rings 43 disposed on respective sides of the annular gasket 42 within the lower cavity.

The adjustment screw member 13 having the helical externally threaded portion 51 formed on the outer peripheral surface thereof is adjustably inserted in the upper cavity of the tubular guide member 22 with the helical externally threaded portion 51 engaged with the helical internally threaded portion 41 in the tubular guide member 22. This adjustment screw member 13 has defined therein a large diameter axial bore 53 extending axially inwardly from a lower end thereof and a reduced diameter axial bore 52 continued coaxially from the large diameter axial bore 53 positioned on one side of the large diameter axial bore 53 adjacent an upper end thereof.

The valve rod 12 is of one-piece construction including a valving member 61 defined at a lower end thereof and axially slidably inserted in the valve hole 34, a shank portion 63 defined at a generally intermediate portion thereof and slidably, but fluid-tightly extending through the annular gasket 42 to seal the valve chamber 33, a collar 62 defined between the shank portion 63 and the valving member 61 so as to protrude radially outwardly therefrom, and a connecting shaft 64 extending coaxially through the bored 52 and 53.

The valving member 61 at the lower end of the valve rod 12 has at least one slit 71 defined therein so as to extend radially thereof, i.e., in a direction perpendicular to the longitudinal axis of the valve rod 12. It is to be noted that the opening of the slit 71 relative to the valve chamber 33 varies depending on the axial position of the valve rod 21 that is adjusted by turning the handle 14 as will be described later. Still further and as is shown in FIG. 1, the length of the slit 71 is shorter than the length of the valving member 61.

The shank portion 63 of the valve rod 12 is of a length effective to retain a sliding contact with the annular gasket 42 at all times during a stroke of movement of the valve rod 21 so that no fluid medium within the valve chamber 33 will flow into the hollow of the tubular guide member 22. This shank portion 63 has a diameter substantially equal to the valving member 61 and, therefore, the shank portion 63 has a cross-sectional area equal to that of the valving member 61.

The connecting shaft 64 has a diameter which may be smaller than that of the shank portion 63 and which is slightly smaller than the diameter of the reduced diameter axial bore 52 in the adjustment screw member 13 to define a first annular clearance therebetween, but smaller than the diameter of the large diameter axial bore 53 in the adjustment screw member 13 to define a second annular clearance of a size greater than that of the first annular clearance.

The valve rod 12 is coupled with the adjustment screw member 13 for movement together therewith by means of a connecting pin 15 tapped through the adjustment screw member 13 across the connecting shaft 64 in a direction radially thereof.

The handle 14 has a central portion formed with a socket 81 defined therein and is mounted on the adjustment screw member 13 with a boss 54, integral with the upper end of the adjustment screw member 13, press-fitted into the socket 81. Accordingly, turning of the handle 14 in either direction about the longitudinal axis of the adjustment screw member 13 results in a corresponding rotation of the adjustment screw member 13 to threadingly move the latter axially.

The handle 14 has an internally threaded hole 73 defined therein so as to extend radially inwardly from an outer peripheral surface thereof and an externally threaded set screw 72 is loosely accommodated within the internally threaded hole 73. This set screw 72 is utilized to lock the handle 14 to avoid any possible arbitrary rotation of the handle 14. This may be done by firmly fastening the set screw 72 after the axial position of the adjustment screw member 13 has been determined to achieve a desired fluid flow.

The throttle valve assembly 1 of the above described construction operated in the following manner.

When the throttle valve assembly 1 is in the closed position interrupting a communication between the inflow port 31 and the outflow port 32 via the valve chamber 33, the collar 62 in the valve rod 12 is seated against and, hence, held in contact with the valve seat 35 as shown in the right-hand portion of FIG. 1. In this condition, the valving member 61 closes the valve hole 34 to interrupt the flow of the fluid medium from the inflow port 31 towards the outflow port 32 through the valve chamber 33. The valve assembly 1 in this condition serves as a stop valve.

When the handle 14 is turned in one direction about the longitudinal axis of the adjustment screw member 13 after the set screw 72 has, if so required, been loosened, the adjustment screw member 13 is correspondingly turned accompanied by an axial movement in a direction, for example, upwardly as viewed in FIG. 1, with the the externally threaded portion 51 engaged with the internally threaded portion 41 in the tubular guide member 22. This upward movement of the screw member 13 results in a corresponding upward shift of the valve rod 12 and, therefore, the collar 62 integral with the valve rod 12 separates away from the valve seat 35 accompanied by an upward shift of the valving member 61 through the valve hole 34.

As the valving member 61 is so shifted upwardly, the valve chamber 33 is communicated with the outflow port 32 through the slit 71 and, therefore, the fluid medium supplied under pressure to the inflow port 31 flows to the outflow port 32 through the valve chamber 33 by way of the slit 71.

At an initial stage of the flow adjustment effected in the manner described above, the fluid medium under pressure flowing from the inflow port 31 into the valve chamber 33 acts on the valve rod 12. However, since the cross-sectional area of the valving member 61 and that of the shank portion 63 of the valve rod 12 are equal to each other as hereinbefore described, the fluid pressures acting on the valve rod 12 to move the latter in directions opposite to each other are counterbalanced and, therefore, an axial thrust tending to move the valve rod 12 in the axial direction will not be induced substantially.

The absence of the axial thrust referred to above means that no substantial surface pressure occur between tooth faces of the externally threaded portion 51 in the adjustment screw member 13 and tooth faces of the internally threaded portion 41 in the tubular guide member 22 which those tooth faces of the externally threaded portion 51 are held in contact with, and therefore, the handle 14 will not be loaded, that is, can be turned easily. If the axial thrust is induced, it acts as a resistance to a turning of the handle 14, requiring an operator to apply a relatively large turning force to the handle 14 to turn the latter.

As the handle 14 is further turned in such one direction accompanied by a further upward shift of the adjustment screw member 13, the effective cross-sectional area of a fluid passage defined by the slit 71 increases and, therefore, the flow of the fluid medium from the valve chamber 33 towards the outflow port 32 through the slit 71 increases correspondingly.

When the collar 62 integral with the valve rod 12 is subsequently brought into contact with an annular stop ring 44 accommodated immovably within the lower cavity in the tubular guide member 22 during the upward shift of the valve rod 12 as shown in the left-hand portion of FIG. 1, the handle 14 will no longer be turned. In other words, the annular stop ring 44 defines the full open position of the throttle valve assembly 1.

Where the flow of the fluid medium under pressure across the throttle valve assembly 1 is desired to be throttled or interrupted, the handle 14 has to be turned in a reverse direction, i.e., in a direction necessary to shift the adjustment screw member 13 downwards as viewed in FIG. 1. If the collar 62 integral with the valve rod 12 then shifted downwardly accompanying the downward shift of the adjustment screw member 13 is seated against the valve seat 35, the throttle valve assembly 1 is brought into the closed position.

Thus, it is clear that, since the valve rod 12 is a member separate from the adjustment screw member 13, but is coupled with the adjustment screw member 13 by means of the connecting pin 15 for movement together therewith, a machining error which would occur in machining and/or boring any one of the valve rod 12, the adjustment screw member 13, the valve hole 34 and the tubular guide member 22 can be advantageously absorbed by one or both of the annular clearances delimited respectively between the wall defining the reduced diameter axial bore 52 in the adjustment screw member 13 and the outer peripheral surface of the connecting shaft 64 of the valve rod 12 and between the wall defining the large diameter axial bore 53 in the adjustment screw member 13 and the outer peripheral surface of the connecting shaft 64 of the valve rod 12.

Accordingly, the manufacture of those component parts of the throttle valve assembly embodying the present invention may not always require a substantially precise machining thereof, making it easy and inexpensive to manufacture the throttle valve assembly according to the present invention. Also, by the reason discussed hereinbefore, not only can the movable component parts of the throttle valve assembly move smoothly, but also the handle 14 can be smoothly turned with an application of a relatively reduced turning force.

Although the present invention has been fully described in connection with the preferred embodiment thereof with reference to the accompanying drawings which are used only for the purpose of illustration, those skilled in the art will readily conceive numerous changes and modifications within the framework of obviousness upon the reading of the specification herein presented of the present invention. For example, instead of the use of the slit 71, or in combination with the use of the slit 71, an end of the valving member 61 confronting in a direction opposite to the valve chamber 33 may be downwardly tapered, as shown by the phantom line in the left-hand portion of FIG. 1, to represent a shape generally similar to an inverted shape of a truncated cone.

Moreover, not only may the shape, the configuration and/or the arrangement of the various component parts of the illustrated throttle valve assembly not be limited to those shown and described and be subject to change according to particular design requirements, but also material for those component parts may be suitably selected.

Furthermore, although the tubular guide member is shown and described as a member separate from the valve body, they may be of one-piece construction.

In addition, in the practice of the present invention, the use of the adjustment screw member is not always essential. Where the adjustment screw member is not employed, the valve rod may be coupled with the handle for rotation together therewith and the tubular guide member may have an outer peripheral surface formed with an externally threaded portion which may be engaged with an internally threaded portion formed on an inner peripheral surface of a peripheral wall of the handle.

Accordingly, such changes and modifications are, unless they depart from the spirit and scope of the present invention as delivered from the claims annexed hereto, to be construed as included therein.

What is claimed is:

1. A fluid flow control valve assembly comprised of a valve housing and a valve rod, said valve housing having a valve chamber, a valve hole, an inflow port, and an outflow port, and said valve rod being provided in said valve chamber and turned by a handle to move in an axial direction so as to adjust an opening of said valve hole wherein, a valve member that is provided on one end of said valve rod so as to face said valve member toward said valve hole, is inserted into said valve hole when moved in an axial direction, A shank portion, that is movable while sealing said valve chamber by a gasket, is formed on an intermediate portion of said valve rod, a valve seat positioned between said valve chamber and said valve hole;

a collar that is formed between said valve member and said shank portion so as to protrude radially and outwardly therefrom, said collar having a slant undersurface which engages with said valve seat, said shank portion which contacts said gasket and a part, which is in contact with said valve seat, of said collar have effective cross-sectional surface areas which are equal to each other, and said valve member has a slit provided on one end thereof so that the length of said slit is shorter than the length of said valve member.

2. The fluid flow control valve assembly as claimed in claim 1, further comprising an adjustment screw member coupled with the handle for rotation together therewith and threadably engaged with an internally threaded portion formed in the housing, said adjustment screw member having an axial bore defined therein and into which the valve rod is inserted, said valve rod being coupled with the adjustment screw member for movement together therewith by means of a connecting pin extending radially through the adjustment screw member across the valve rod.

* * * * *